UNITED STATES PATENT OFFICE.

BOTHO SCHWERIN, OF FRANKFORT-ON-THE-MAIN, GERMANY.

PROCESS OF MANUFACTURING POROUS BODIES.

1,027,004.   Specification of Letters Patent.   Patented May 21, 1912.

No Drawing.   Application filed February 17, 1911.   Serial No. 609,148.

*To all whom it may concern:*

Be it known that I, BOTHO SCHWERIN, a subject of the German Emperor, and a resident of Frankfort-on-the-Main, Germany, have invented certain new and useful Improvements in Processes of Manufacturing Porous Bodies, of which the following is a specification.

My invention relates to improvements in a process of manufacturing porous bodies from carborundum, corundum, and the like.

The object of the improvements is to provide a product which by reason of its purity is particularly suitable for chemical, electrochemical and other purposes, which can be used in the manufacture of diaphragms, and which is very porous and adapted to absorb large quantities of water.

If the product is to be made for example from carborundum or corundum, the process is carried out as follows: The raw material is finely ground and elutriated. The elutriation is advantageously carried out by suspending the finely ground material in water to which is added a basic substance such as ammonia if the material treated is of an electro-negative character, such as carborundum for example, or if such material is of an electro-positive character, as corundum, an acid such as acetic acid is added. To the finest particles thus obtained which have been separated from the coarser particles by the elutriation and suspension in the water used for the elutriation, and hence obtained in an exceedingly finely divided condition, and in a condition comparable with that of particles of a colloidal nature, enough water is added to produce a paste which can be formed or molded into the desired shape. The articles thus formed or molded are dried and burned to form the desired product. Owing to the finely divided condition of the particles used and their properties which partake of a colloidal nature, the refractory materials used, such as carborundum or corundum, which in their natural state are not plastic and are incapable of being molded and burned, are rendered capable of being so molded and burned, without the addition of any foreign binding medium. They are thus converted from materials naturally non-plastic into a condition comparable with that of the natural plastics such as clay, and can be molded and burned to form porous and coherent, but still highly refractory and strongly resistive, products. In the case of such an oxidizable material as carborundum the burning is advantageously carried out in a non-oxidizing or reducing atmosphere since an oxidizing fire or an oxidizing current of air would convert a portion of the finely divided carborundum into silicic acid the presence of which in the final product would render the latter liable to crack or expand.

The present process differs from processes heretofore in use in that the particles of the resulting products are not bound together by melting or fusion, nor by means of a molten binding medium, but are formed into a coherent porous mass by being brought into direct contact with one another and by burning. No fusible flux or binding medium is therefore present in the resulting product.

It is sometimes advantageous to carry out the process by adding to the material an unstable or removable binding medium such, for example, as starch, which either disappears in the course of the further treatment of the material, or is afterward removed. As carborundum does not melt at all, and corundum only at the highest temperatures, the burning temperature may be varied within large limits.

The process may be further improved by removing from the material treated (carborundum, corundum, etc.) any natural impurities such as iron compounds, or any foreign substances such as particles of iron that may have been introduced when grinding the material, by successively boiling the same with concentrated hydrochloric acid, nitrohydrochloric acid, hydrofluoric acid, and concentrated soda lye. Between each boiling operation the material is filtered and thoroughly washed. After being thus thoroughly cleaned the substances have properties which they do not possess in an uncleaned state. For example the conductivity which before was high is reduced almost to zero, and the stability under chemical influences is increased.

The articles made from the material are hard and have a metallic sound. They do not change their form when burning the same, and their surfaces are not changed. The articles may be made either with a rough or smooth surface, or a reflecting surface may even be imparted thereto, for which purposes they are molded or formed either on a rough, smooth or reflecting surface. Patterns or sketches which are applied thereto before drying and burning are not changed by the burning process. As the articles do not contain any foreign matter, they have the stability of the carborundum or corundum, and they may be used for various purposes, for example in the manufacture of diaphragms. Diaphragms made from my improved material are suitable for example for electrolytic purposes, in which case at one side of the diaphragm there may be an acid and at the opposite side an alkaline electrolyte. The porosity of the material is large and it depends exclusively on the size of the parts, the porosity being larger if the material is made of smaller particles.

The articles made by my process can be used wherever a material is required, which has a high degree of porosity, which is refractory, unaffected by chemical influences and hard, and which does not change its form.

In burning porcelain a reducing atmosphere has been used. However, in this case the use of a reducing atmosphere has no influence on the burning process as such. The hardening of the porcelain and the change of the structure and shape caused by the hardening are exactly the same, whether burning be effected in a reducing or in an oxidizing atmosphere, because the material subjected to the burning process is not itself subjected to oxidation. In this case the reducing atmosphere has exclusively the function to reduce the impurities of the material which consist of the coloring iron oxid into the colorless protoxid. In my improved process, however, materials are treated which, at the necessary temperature, are themselves subjected to oxidation by the oxid of the air.

I claim herein as my invention:

1. The herein described process of producing articles of carborundum, corundum, and similar refractory materials which comprises grinding the raw material, separating from the finely ground material the finest particles by elutriation, molding the same, and burning the molded article.

2. The herein described process of producing articles of carborundum, corundum, and similar refractory material, which comprises grinding the raw material, cleaning the same, separating from the finely ground and cleaned material the finest particles by elutriation, molding the same, and burning the molded article.

3. The herein described process of producing articles of carborundum, which comprises grinding the crude material, separating from the finely ground material the finest particles by elutriation, molding the same, and burning the molded article in a non-oxidizing atmosphere.

In testimony whereof I have signed my name to this specification in the presence of two subscribing witnesses.

BOTHO SCHWERIN.

Witnesses:
JEAN GRUND,
FRIEDEL COLLISCHANN.